(12) United States Patent
Granqvist

(10) Patent No.: US 8,355,194 B2
(45) Date of Patent: Jan. 15, 2013

(54) COMBINED THERMOCHROMIC AND ELECTROCHROMIC OPTICAL DEVICE

(75) Inventor: Claes Göran Granqvist, Uppsala (SE)

(73) Assignee: ChromoGenics AB, Uppsala (SE)

( * ) Notice: Subject to any disclaimer, the term of this patent is extended or adjusted under 35 U.S.C. 154(b) by 61 days.

(21) Appl. No.: 13/061,763

(22) PCT Filed: Aug. 31, 2009

(86) PCT No.: PCT/EP2009/061211
§ 371 (c)(1),
(2), (4) Date: May 20, 2011

(87) PCT Pub. No.: WO2010/026125
PCT Pub. Date: Mar. 11, 2010

(65) Prior Publication Data
US 2011/0216388 A1  Sep. 8, 2011

(30) Foreign Application Priority Data
Sep. 2, 2008  (SE) ........................ 0801891

(51) Int. Cl.
*G02F 1/15* (2006.01)
*G02F 1/01* (2006.01)
(52) U.S. Cl. ........................ 359/265; 359/288
(58) Field of Classification Search .................. 359/265, 359/288
See application file for complete search history.

(56) References Cited

U.S. PATENT DOCUMENTS

| 4,902,108 A | 2/1990 | Byker |
| 5,352,504 A | 10/1994 | Boulanger et al. |
| 5,525,430 A | 6/1996 | Chahroudi |
| 6,446,402 B1 | 9/2002 | Byker et al. |
| 2005/0002081 A1 | 1/2005 | Beteille et al. |

FOREIGN PATENT DOCUMENTS

| JP | 05-297417 | * 11/1993 |
| JP | 05297417 A | 11/1993 |

OTHER PUBLICATIONS

Paradis, S. et al.: "Vanadium oxide films for optical modulation applications", Proceedings of SPIE, the International Society for Optical Engineering, vol. 6343, 2006, pp. 6343U-1-6343U-7, Cited in ISR.
International Search Report, dated Nov. 6, 2009, from corresponding PCT application.

* cited by examiner

*Primary Examiner* — Joseph P Martinez
(74) *Attorney, Agent, or Firm* — Young & Thompson

(57) ABSTRACT

An optical device (1) includes a first transparent substrate (10), a thermochromic device (20) covering a surface (11) of the first transparent substrate (10), a second transparent substrate (50), an electrochromic device (40) covering a surface (51) of the second transparent substrate (50) and a thermally insulating volume (30) separating the first transparent substrate (10) and the second transparent substrate (50). The thermally insulating volume (30) is preferably a vacuum volume or a volume (31) filled with gas.

18 Claims, 1 Drawing Sheet

COMBINED THERMOCHROMIC AND ELECTROCHROMIC OPTICAL DEVICE

TECHNICAL FIELD

The present invention relates in general to optical devices comprising chromogenic materials, and in particular to optical devices comprising thermochromic and electrochromic devices.

BACKGROUND

Global warming is receiving world wide attention, and means to alleviate its harmful consequences are very much in focus. Energy used for heating, cooling, ventilation and lighting of built environments amounts to a considerable portion of the available primary energy in the world. In particular, the energy demand for cooling by air conditioning has grown very rapidly during the last years. The growth in the energy expenditure is based on increasing demands for indoor comfort. The temperature is requested to be kept within a narrow temperature interval and outdoor contact via large windows and glass façades is considered as an important factor for experiencing comfort.

One way to improve the situation is to have building envelopes with variable throughput of visible and/or near infrared light, e.g. of solar energy. This is often referred to as smart windows solutions. Smart windows can make use of a range of chromogenic technologies, where the term chromogenic is used to indicate that the optical properties can be changed in response to an external stimulus. The main chromogenic technologies are electrochromic (depending on electrical voltage or charge), thermochromic (depending on temperature), photochromic (depending on ultraviolet irradiation), and gasochromic (depending on exposure to reducing or oxidizing gases).

The different techniques are in prior art well known as such and have also been studied in the concept of controlling transfer of energy through different optical devices. One example of the use of chromogenic substances for varying a transmittance can be found in e.g. the U.S. Pat. No. 4,902,108. In the U.S. Pat. No. 5,525,430, the temperature of a thermochromic substance is controlled by resistive heating, making it operating as a kind of electrochromic device. In the patent application US 2005/0002081, an active system controlling transmission can consist of an electrochromic layer or a thermochromic layer. Electrochromic devices are in prior art mainly utilized when visible transmission is in focus. Thermochromic devices are instead primarily directed to approaches where near infrared transmission is of most importance.

In the patent abstract JP05297417, a thermochromic and an electrochromic layer are laminated into an integrated device. A combination of some of the benefits of the different techniques may thus be achieved. However, there are remaining problems with optical devices using laminated thermochromic and electrochromic layers. In certain situations, the impinging light power may heat the laminate to a temperature considerably above the transition temperature of the thermochromic film, thereby causing a screening of the near infrared wavelengths. This may be the case even in cases where the ambient temperature is far below the transition temperature and transmission of the near infrared light would be beneficial for e.g. heating purposes.

SUMMARY

An object of the present invention is to provide optical devices where the thermochromic and electrochromic properties can be exploited independently of each other. The above object is achieved by optical devices according to the enclosed patent claims. In general words, an optical device comprises a first transparent substrate, a thermochromic device covering a surface of the first transparent substrate, a second transparent substrate, an electrochromic device covering a surface of the second transparent substrate and a thermally insulating volume separating the first transparent substrate and the second transparent substrate.

One advantage with the present invention is that the thermochromic device properties are controllable by the ambient temperature of the first transparent substrate, while the properties and behaviours of the second transparent substrate and the electrochromic device are managed independently.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 1:
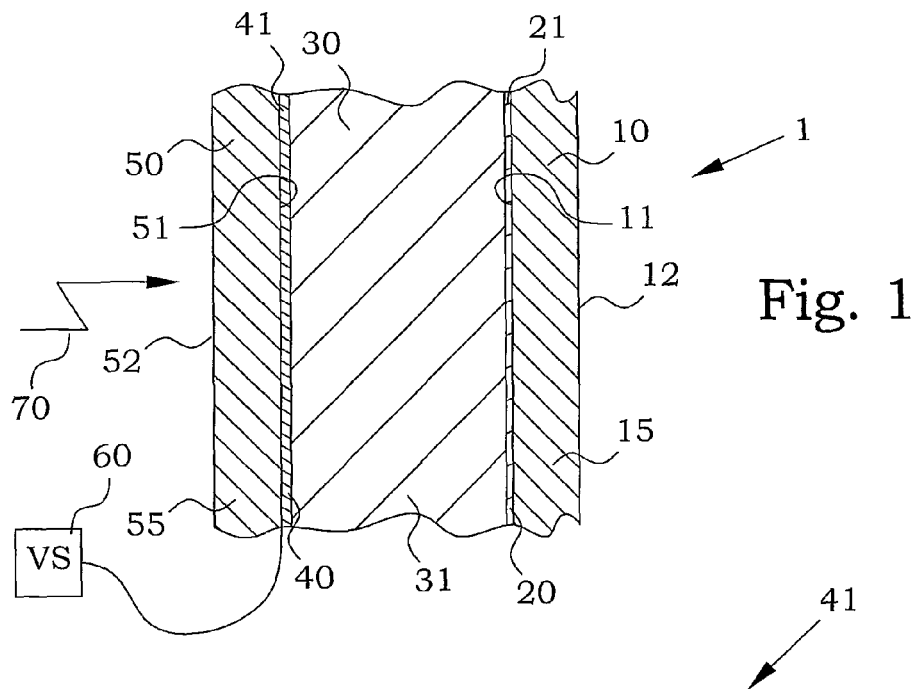
FIG. 1 is a schematic view of a part of an optical device according to an embodiment of the present invention.

FIG. 1 illustrates an optical device 1 according to an embodiment of the present invention. The optical device 1 comprises a first transparent substrate 10, having a first surface 11 and a second surface 12. The first transparent substrate 10 is in the present embodiment a plane glass plate 15. The first transparent substrate 10 is covered, at least to a part, by a thermochromic device 20. In the present embodiment, the thermochromic device 20 is provided at the first surface 11 of the first transparent substrate 10. In the present embodiment, as an example, the thermochromic device comprises a $VO_2$ film doped with Al and W.

The optical device 1 further comprises a second transparent substrate 50, having a first surface 51 and a second surface 52. The second transparent substrate 50 is in the present embodiment also a plane glass plate 55. The second transparent substrate 50 is covered, at least to a part, by an electrochromic device 40. In the present embodiment, the electrochromic device 40 is provided at the first surface 51 of the second transparent substrate 50. In the present embodiment, as an example, the electrochromic device 40 comprises a 5-layer stack 41, described in further detail below.

The first transparent substrate 10 and the second transparent substrate 50 are arranged with a thermally insulating volume 30 separating the first transparent substrate 10 and the second transparent substrate 50. The thermally insulating volume 30 is preferably essentially transparent, but for certain applications also coloured or partly non-transparent thermally insulating volume 30 may be possible. In the present embodiment, the thermally insulating volume 30 is filled with a gas 31, in this embodiment argon gas, preferably at a pressure lower than atmospheric pressure. In the present embodiment, the first transparent substrate 10 is arranged with the first surface 11 facing the insulating volume 30, i.e. the thermochromic device 20 comes into contact with the gas 31. The gas 31 can preferably be selected in order to be harmless for the thermochromic device 20, typically an inert gas or nitrogen. In the present embodiment, the second transparent substrate 50 is also arranged with its first surface 51 facing the insulating volume 30, i.e. also the electrochromic device 40 comes into contact with the gas 31. The gas 31 can therefore preferably also be selected in order to be harmless for the electrochromic device 40.

A voltage supply 60 is electrically connected to the electrochromic device 40. By controlling a voltage applied over the electrochromic device 40, the optical properties thereof can be controlled. Assume that light 70 falls onto the second transparent substrate 50. The electrochromic device 40 can be controlled by the voltage from the voltage supply 60 to change the transmission of the light through the electrochromic device 40. The light 70 can thereby be more or less prohibited to pass the electrochromic device 40, or the light 70 may to a large portion pass the electrochromic device 40, depending of the state of the electrochromic device 40.

In case the electrochromic device 40 allows a high transmission, the light 70 may pass the thermally insulating volume 30 and reach the thermochromic device 20. Depending on the temperature of the thermochromic device 20, the thermochromic device 20 may stop the near infrared light from passing the thermochromic device 20 or may allow the near infrared light to pass the thermochromic device 20. The transmission properties are controlled by the temperature of the thermochromic device 20, which due to the thermally insulating volume 30 is supposed to be close to the temperature of the first transparent substrate 10. The temperature of the first transparent substrate 10 is in turn typically close to the temperature ambient to the first transparent substrate 10. In this way, the behaviour of the thermochromic device 20 is decoupled from the properties of the electrochromic device 40 and the second transparent substrate 50. In such a way, the ambient temperature outside the second transparent substrate 50 does not influence the behaviour of the thermochromic device 20, neither do the irradiation conditions and temperature of the second transparent substrate 50.

As an example, consider a case where a very intense light falls onto the second transparent substrate 50. The electrochromic device 40 may under such circumstances be heated considerably above the ambient temperature. However, the state of the electrochromic device 40 is controlled by the applied voltage and can be selected independently of this temperature. The thermally insulating volume 30 insulates the first transparent substrate 10 from the second transparent substrate 50 and the thermochromic device 20 can thereby experience a much lower temperature, typically close to the ambient temperature outside the first transparent substrate 10. A high transparency for the near infrared light can thus be offered despite the high temperature of the electrochromic device 40.

The optical device 1 of FIG. 1 can thereby be optimized both concerning visible light throughput, which is mainly controlled by the electrochromic device 40, and concerning the heat transfer, which is mainly controlled by the thermochromic device 20. The arrangement with the thermally insulating volume 30 between the thermochromic device 20 and the electrochromic device 40 enables the separation of the control possibilities; a simple arrangement that has significant impact onto the performance of the optical device.

Figure 2:
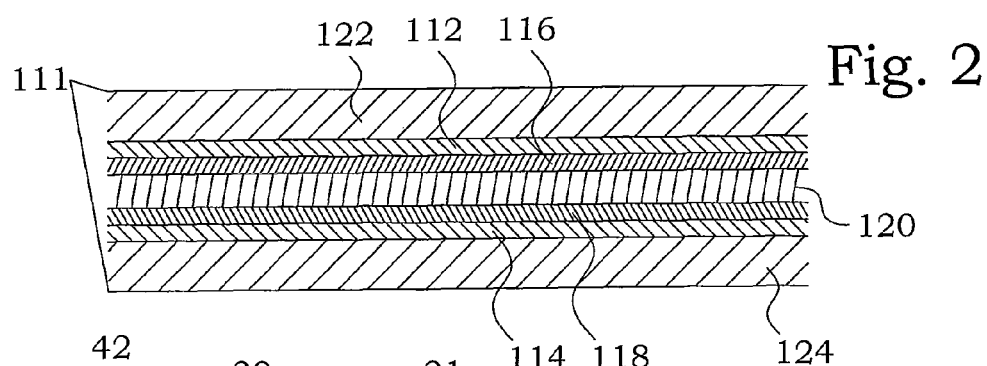
FIG. 2 is a schematic view of an electrochromic stack useful in an optical device according to the present invention.

In the embodiment of FIG. 1, a non-self erasing 5-layer stack 41 was utilized. Such an arrangement is illustrated more in detail in FIG. 2. In the centre part, an ion conductor, i.e. an electrolyte layer 120 is provided. The electrolyte layer 120 is on one side in contact with an electrochromic layer 116, capable of conducting electrons as well as ions. On the other side of the ion conductor 120 is an electron and ion conducting counter electrode layer 118, serving as an ion storage layer. This counter electrode film 118 may entirely or partly be constituted by a second electrochromic film. The central three-layer structure 116, 118, 120 is positioned between electron conducting layers 112, 114. The electron conducting layers 112, 114 are arranged against a first 122 and a second 124 substrate, respectively. One of these substrates 122, 124 may be constituted by the first transparent substrate 50 (FIG. 1). Note that the relative thicknesses of the layers in the different figures in the present disclosure do not represent the true relationship in dimensions. Typically, the substrates are much thicker than the other layers. The figures are drawn only for the purpose to illustrate connection principles, not to give any dimensional information.

Such an electrochromic 5-layer stack 41 is colored/bleached by applying an external voltage pulse between the electron conducting layers 112, 114 on the two sides of the stack 111, causing the electrons and ions to move between the electrochromic layer 116 and the counter electrode layer 118. The electrochromic layer 116 will thereby change its color. Non-exclusive examples of electrochromic layers 116 are cathodically coloring thin films of oxides based on tungsten, molybdenum, niobium, titanium, lead and/or bismuth, or anodically coloring thin films of oxides, hydroxides and/or oxy-hydrides based on nickel, iridium, iron, chromium, cobalt and/or rhodium.

The substrates 122, 124 have to be transparent, in order to reveal the electrochromic properties of the electrochromic layer 116 to the surroundings. In a typical case today, plastic substrates are used. However, as mentioned above also glass substrates are feasible.

Also the two electron conducting layers 112, 114 must be transparent. Non-exclusive examples of electron conductors 112, 114 transparent to visible light are thin films of Indium Tin oxide (ITO), Tin oxide, Zinc oxide, n- or p-doped Zinc oxide and Zinc oxyfluoride. Metal-based layers, such as ZnS/Ag/ZnS and carbon nanotube layers have been recently explored as well. Depending on the particular application, one or both electron conductor layers 112, 114 may be made of a metal grid.

As mentioned above, a counter electrode layer 118 may comprise electrochromic materials as well as non-electrochromic materials. Non-exclusive examples of counter electrode layers 118 are cathodically coloring electrochromic thin films of oxides based on tungsten, molybdenum, niobium, titanium, lead and/or bismuth, anodically coloring electrochromic thin films of oxides, hydroxides and/or oxy-hydrides based on nickel, iridium, iron, chromium, cobalt and/or rhodium, or non-electrochromic thin films e.g. of oxides based on vanadium and/or cerium as well as activated carbon. Also combinations of such materials can be used as a counter electrode layer 118.

The electrolyte layer 120 comprises an ion conductor material. Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of $TiO_2$, silica or other oxides. Some non-exclusive examples of lithium salts used are LiTFSI

[lithium bis(trifluoromethane)sulfonimide], LiBF4 [lithium tetrafluoroborate], LiAsF6 [lithium hexafluoro arsenate], LiCF3SO3 [lithium trifluoromethane sulfonate], and LiClO4 [lithium perchlorate].

Figure 3:
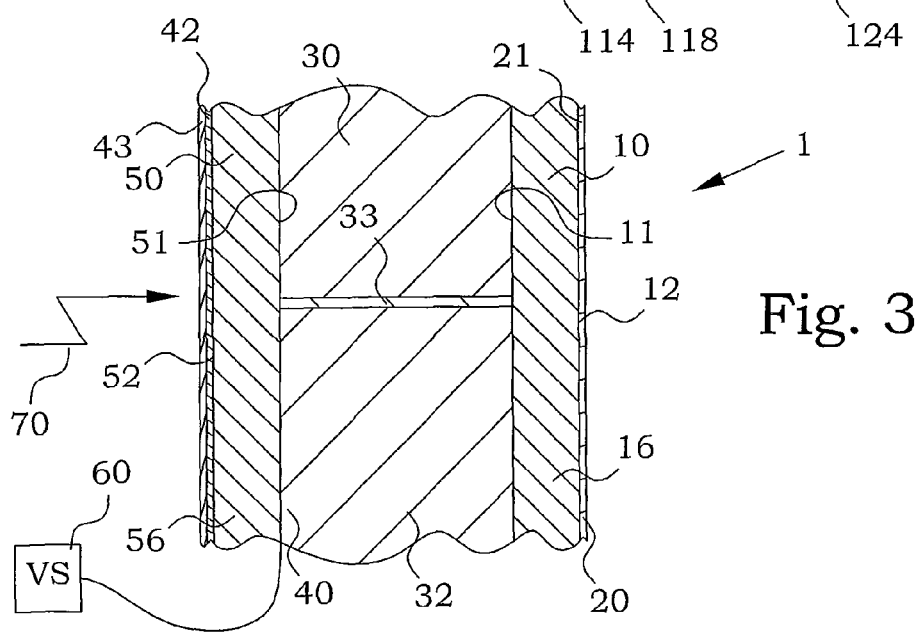
FIG. 3 is a schematic view of a part of an optical device according to another embodiment of the present invention.

FIG. 3 illustrates an optical device 1 according to another embodiment of the present invention. In this embodiment, the first transparent substrate 10 is a plastic substrate 16 and the second transparent substrate 50 is also a plastic substrate 56, equal or different to the plastic substrate 16. In the most general sense, the plastic substrates 16, 56 are synthetic or semisynthetic polymerization products. The plastic substrates are commonly classified by its polymer backbone. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers.

In the present embodiment, the thermally insulating volume 30 is a volume of vacuum 32. The plastic substrates 16, 56 have certain resilience and in order to maintain the distance between the first transparent substrate 10 and the second transparent substrate 50, rigid mechanical cross-connections 33 are provided at suitable distances. The size, geometry and distribution of the cross-connections 33 are preferably adapted in order not to significantly disturb the view through the optical device 1. Typical useful geometries of cross-connections 33 are spherical or rod-like.

The electrochromic device 40 is in this embodiment of a self-erasing type electrochromic device 42, e.g. according to the teachings of the U.S. Pat. No. 6,084,700. The electrochromic device 40 is provided at the second surface 52 of the second transparent substrate 50. In order to protect the electrochromic device 40, it is in turn covered by a transparent protection film 43, having good resistance against e.g. scratching or chemical wear. The thermochromic device 20 is in this embodiment a stack 22 of films of alternating $VO_2$ and $TiO_2$. The thermochromic device 20 is provided at the second surface 12 of the first transparent substrate 10. Optionally, also the thermochromic device 20 can be protected by additional films. The advantage of having the thermochromic device 20 at a surface of the first transparent substrate 10 opposite to the thermally insulating volume 30 is that the thermochromic device 20 directly will experience the ambient temperature.

The present invention can be applied in many different optical devices, where a controlled transmission is requested. The geometrical shape is not restricted to plane transparent substrates, thermochromic devices and/or electrochromic devices. Also all types of curved shapes can be used. The shapes of the thermochromic device and the electrochromic device may be congruent with each other or not. Also, the first and second transparent substrates may be of the same or different types. For instance, one of the transparent substrates may be a rigid glass substrate while the other is a resilient polymer substrate.

In the embodiments of FIGS. 1 and 3, the electrochromic device 40 and the thermochromic device 20 were either both directed towards the thermally insulating volume 30 or away from the thermally insulating volume 30. However, also embodiments where one of the films 20, 40 is facing the thermally insulating volume 30 and one is turned away from the thermally insulating volume 30 are possible.

The thermochromic device has preferably a high transparency in a visible wavelength region, in order to provide a good sight through the optical device. Preferably, the transparency in the visible wavelength region exceeds 0.5, which allows for a reasonable sight through the optical device. More preferably, the transparency in the visible wavelength region exceeds 0.7, where the attenuation effect of the thermochromic device starts to be less important for the visible impression.

Also the transition behaviour of the thermochromic device is of importance. The transition temperature should be adapted to the intended operation temperature. For applications to be operated around room temperature, the thermochromic device has preferably a transition temperature that is lower than 35° C., or even more preferably, lower than 25° C. For other applications, other transition temperatures may be the optimum. The transition temperature may e.g. be adapted by doping of the thermochromic material. Examples of useful dopants are W, Mo, Ti, Nb, Ir and Ta.

Since the thermally insulating volume has a significant importance for the function of the present invention, the thermal conductivity of the thermally insulating volume may be of importance. For applications where the temperature differences across the optical device is moderate, e.g. for typical window applications, the thermal conductivity is preferably less than 0.1 W/mK. For higher temperature differences or for even more accurate operation, thermal conductivities less than 0.05 W/mK may be to prefer. This puts constraints on the selection and properties of the substance in the thermally insulating volume.

The present ideas can be applied to many types of optical devices. Common for most of the important optical devices of interest is that light is intended to pass between the electrochromic device and the thermochromic device by a light path at least partly constituted by the thermally insulating volume. In typical optical devices, the distance between the electrochromic device and the thermochromic device is less than 10 meters, most often less than 1 meter. The minimum distance is basically determined by the thermal conductivity of the thermally insulating volume. For very well insulating volumes, the distance is typically larger than 0.1 mm. For thermally insulating volumes with somewhat higher thermal conductivities, a millimetre up to a couple of millimetres is a typical useful range for the distance between the electrochromic device and the thermochromic device.

The embodiments described above are to be understood as a few illustrative examples of the present invention. Other alternatives are, however, also possible. In the illustrated embodiments, transparent substrates have been used for supporting the thermochromic device and the electrochromic device. However, the thermochromic device and/or the electrochromic device could also be provided as self-bearing components, in which case the corresponding transparent substrate may be omitted. In cases the thermally insulating volume comprises solid, e.g. porous structures, the thermochromic device and/or the electrochromic device could also utilize the surface of the thermally insulating volume itself as a substrate. In the cases where the thermally insulating volume is constituted by gas or vacuum, transparent substrates are the most convenient solution.

It will be understood by those skilled in the art that various modifications, combinations and changes may be made to the embodiments without departing from the scope of the present invention. In particular, different part solutions in the different embodiments can be combined in other configurations, where technically possible. In particular, the choices of electrochromic and thermochromic devices can be combined in any combination. The scope of the present invention is, however, defined by the appended claims.

REFERENCES

U.S. Pat. No. 4,902,108
U.S. Pat. No. 5,525,430

Published US patent application 2005/0002081
Japanese patent abstract JP05297417

The invention claimed is:

1. Optical device, comprising:
   a thermochromic device;
   an electrochromic device; and
   a thermally insulating volume separating said thermochromic device and said electrochromic device;
   whereby said thermally insulating volume constitutes at least a part of a light path between said thermochromic device and said electrochromic device.

2. Optical device according to claim 1, further comprising:
   a first transparent substrate;
   said thermochromic device covering a surface of said first transparent substrate; and
   a second transparent substrate;
   said electrochromic device covering a surface of said second transparent substrate;
   said thermally insulating volume separating said first transparent substrate and said second transparent substrate.

3. Optical device according to claim 2, wherein said thermally insulating volume is a gas volume.

4. Optical device according to claim 2, wherein said thermally insulating volume is a volume of vacuum.

5. Optical device according to claim 2, wherein said surface of said first transparent substrate covered by said thermochromic device faces said thermally insulating volume.

6. Optical device according to claim 2, wherein said surface of said second transparent substrate covered by said electrochromic device faces said thermally insulating volume.

7. Optical device according to claim 2, wherein said thermochromic device has a transparency in a visible wavelength region exceeding 0.7.

8. Optical device according to claim 2, wherein said thermochromic device has a transition temperature lower than 35° C.

9. Optical device according to claim 8, wherein said thermochromic device has a transition temperature lower than 25° C.

10. Optical device according to claim 2, wherein said thermally insulating volume has a thermal conductivity less than 0.1 W/mK.

11. Optical device according to claim 10, wherein said thermally insulating volume has a thermal conductivity less than 0.05 W/mK.

12. Optical device according to claim 1, wherein said thermally insulating volume is a gas volume.

13. Optical device according to claim 1, wherein said thermally insulating volume is a volume of vacuum.

14. Optical device according to claim 1, wherein said thermochromic device has a transparency in a visible wavelength region exceeding 0.7.

15. Optical device according to claim 1, wherein said thermochromic device has a transition temperature lower than 35° C.

16. Optical device according to claim 15, wherein said thermochromic device has a transition temperature lower than 25° C.

17. Optical device according to claim 1, wherein said thermally insulating volume has a thermal conductivity less than 0.1 W/mK.

18. Optical device according to claim 17, wherein said thermally insulating volume has a thermal conductivity less than 0.05 W/mK.

* * * * *

UNITED STATES PATENT AND TRADEMARK OFFICE
CERTIFICATE OF CORRECTION

PATENT NO.      : 8,355,194 B2
APPLICATION NO. : 13/061763
DATED           : January 15, 2013
INVENTOR(S)     : Claes Göran Granqvist It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 140 days.

Signed and Sealed this
First Day of September, 2015

Michelle K. Lee
*Director of the United States Patent and Trademark Office*